US009722503B2

(12) United States Patent
Ledezma et al.

(10) Patent No.: US 9,722,503 B2
(45) Date of Patent: Aug. 1, 2017

(54) MODULAR CONFIGURABLE MULTI-MEGAWATT POWER AMPLIFIER

(71) Applicant: TECO-Westinghouse Motor Company, Round Rock, TX (US)

(72) Inventors: Enrique Ledezma, Austin, TX (US); Thomas Keister, Georgetown, TX (US); Kaiyu Wang, Round Rock, TX (US); Ryan Edwards, Round Rock, TX (US); Randall Pipho, Leander, TX (US); Bhaskara Palle, Round Rock, TX (US); Alex Skorcz, Cedar Park, TX (US)

(73) Assignee: TECO-Westinghouse Motor Company, Round Rock, TX (US)

( * ) Notice: Subject to any disclaimer, the term of this patent is extended or adjusted under 35 U.S.C. 154(b) by 273 days.

(21) Appl. No.: 14/226,048

(22) Filed: Mar. 26, 2014

(65) Prior Publication Data

US 2014/0293663 A1 Oct. 2, 2014

Related U.S. Application Data

(60) Provisional application No. 61/902,436, filed on Nov. 11, 2013, provisional application No. 61/806,091, filed on Mar. 28, 2013.

(51) Int. Cl.
*H02M 5/458* (2006.01)
*H02M 7/49* (2007.01)
(Continued)

(52) U.S. Cl.
CPC ............. *H02M 5/458* (2013.01); *H02M 7/49* (2013.01); *H02M 5/453* (2013.01); *H02M 7/003* (2013.01)

(58) Field of Classification Search
CPC ............ H02M 7/68; H02M 7/70; H02M 7/72; H02M 7/75; H02M 7/753; H02M 7/757;
(Continued)

(56) References Cited

U.S. PATENT DOCUMENTS

| 3,614,461 | A | * | 10/1971 | Speer | ........................ | H02P 9/42 307/64 |
| 6,055,163 | A | * | 4/2000 | Wagner | ..................... | H02J 3/38 323/241 |

(Continued)

FOREIGN PATENT DOCUMENTS

| JP | 2007-116891 | 5/2007 |
| KR | 10-2010-000763 | 2/2010 |

OTHER PUBLICATIONS

International Searching Authority, "Notification of Transmittal of the International Search Report and the Written Opinion of the International Searching Authority," mailed Oct. 2, 2014, in International application No. PCT/US2014/032004.

(Continued)

*Primary Examiner* — Harry Behm
*Assistant Examiner* — Bryan R Perez
(74) *Attorney, Agent, or Firm* — Trop, Pruner & Hu, P.C.

(57) ABSTRACT

In an embodiment, a power converter includes: a plurality of power amplifier units, each having: a plurality of slice each with a power conversion module including an AC/DC/AC converter; a mains controller to control the plurality of slices; and a feedback conditioning system coupled to the mains controller; a plurality of input contactors and a plurality of output contactors via which each of the plurality of power amplifier units is to couple between a transformer and a load; and a master controller coupled to the plurality of power amplifier units.

17 Claims, 13 Drawing Sheets

(51) Int. Cl.
*H02M 5/453* (2006.01)
*H02M 7/00* (2006.01)

(58) Field of Classification Search
CPC ...... H02M 7/7575; H02M 7/758; H02M 5/40; H02M 5/453; H02M 5/1458; H02M 5/4585; H02J 3/34; H02J 3/38; H02J 3/46; H02P 3/14
USPC ..... 363/97, 98, 131, 132, 95, 37; 322/27, 28
See application file for complete search history.

(56) References Cited

U.S. PATENT DOCUMENTS

| | | | | |
|---|---|---|---|---|
| 6,067,243 | A * | 5/2000 | Suzuki | H02M 7/2173 363/127 |
| 6,822,866 | B2 * | 11/2004 | Fearing | H02M 7/003 165/286 |
| 7,324,360 | B2 | 1/2008 | Ritter et al. | |
| 7,477,037 | B2 * | 1/2009 | Amorino | H02P 29/032 318/803 |
| 8,014,110 | B2 * | 9/2011 | Schnetzka | F25B 49/025 318/434 |
| 8,130,501 | B2 | 3/2012 | Ledezma et al. | |
| 8,279,640 | B2 | 10/2012 | Abolhassani et al. | |
| 8,601,190 | B2 | 12/2013 | Pipho et al. | |
| 8,755,198 | B2 | 6/2014 | Jo et al. | |
| 2006/0109701 | A1 | 5/2006 | Morcov et al. | |
| 2009/0251009 | A1 | 10/2009 | Kleinecke et al. | |
| 2010/0073970 | A1 | 3/2010 | Abolhassani et al. | |
| 2010/0133816 | A1 * | 6/2010 | Abolhassani | H02K 3/28 290/44 |
| 2010/0142234 | A1 * | 6/2010 | Abolhassani | H02M 7/49 363/41 |
| 2010/0213921 | A1 * | 8/2010 | Abolhassani | H01F 27/385 323/328 |
| 2010/0328883 | A1 * | 12/2010 | Ledezma | H02M 7/003 361/690 |
| 2012/0331195 | A1 * | 12/2012 | Pipho | G06F 13/364 710/110 |
| 2013/0093376 | A1 * | 4/2013 | Yoo | H02M 1/126 318/503 |

OTHER PUBLICATIONS

Enrique Ledezma, et al., "Development of a Modular Configurable Multi-Megawatt Power Amplifier," Industrial Electronics Society, IECON 2013—39th Annual Conference of the IEEE, Nov. 10-13, 2013, pp. 631-636.

* cited by examiner

MODULAR CONFIGURABLE MULTI-MEGAWATT POWER AMPLIFIER

This application claims priority to U.S. Provisional Patent Application Ser. No. 61/902,436, filed Nov. 11, 2013, and U.S. Provisional Patent Application Ser. No. 61/806,091, filed Mar. 28, 2013, the content of which is hereby incorporated by reference.

BACKGROUND

Recently, it has been more common to use multi-level power converters to condition received utility power into desired conditioned power signals for delivery to/from various equipment types. There is considerable interest in improving efficiency, manufacturability, commissioning time, transient response, reliability, availability, and physical size of such power converter systems. All of this is being required at megawatt levels with demanding high performance drive characteristics. Due to these industrial demands, power electronic conversion must look at these challenges in non-traditional ways of implementing control, power scalability, and redundancy to provide real system solutions to face unique industrial applications.

SUMMARY OF THE INVENTION

In an embodiment, a power converter includes: a plurality of power amplifier units, each having: a plurality of slice each with a power conversion module including an AC/DC/AC converter; a mains controller to control the plurality of slices; and a feedback conditioning system coupled to the mains controller; a plurality of input contactors and a plurality of output contactors via which each of the plurality of power amplifier units is to couple between a transformer and a load; and a master controller coupled to the plurality of power amplifier units.

The master controller may enable redundancy such that the power converter is to operate with at least one of the power amplifier units being disabled. Each of the power amplifier units may be a modular configurable unit to operate in a selected one or more of a regenerative mode, a partial regenerative mode, and a non-regenerative mode.

In an embodiment, each of the plurality of slices comprises a transformer and a plurality of power cubes each including a power conversion module and configured within an insulative housing. The power cubes of at least some of the slices comprise an active front end.

In an embodiment, the mains controller of a first power amplifier unit produces regenerative controller commands to enable the regenerative mode based on control signals generated using a leakage inductance model. The leakage inductance model is based on one or more parameters extracted from the transformer of the slice, in an embodiment.

In an embodiment, a bus assembly is configured to flexibly couple together the slices of at least one of the plurality of power amplifier units. The bus assembly may be adapted to a top portion of a plurality of cabinets each including at least one of the plurality of slices of one of the power amplifier units.

In an embodiment, an external application is to cause the corresponding power amplifier units to inject power into the load or to extract power from the load, in an open or closed loop mode.

In one configuration, in a first power amplifier unit, a first portion of the slices are coupled in series and a second portion of the slices are coupled in series, where the first and second portions are coupled in parallel and the number of the plurality of slices is field configurable. Each of the power amplifier units may further comprise a plurality of slice controllers each associated with one of the plurality of slices, and the plurality of slice controllers to translate vector commands from the mains controller to control signals for the corresponding slice. Each of the power amplifier units further comprises at least one cooling system to provide cooling to the plurality of slices, and which may use a liquid coolant.

In an embodiment, a method comprises: generating a plurality of control signals for each of a plurality of slices of a power converter in a regenerative mode using an equivalent multi-winding transformer leakage inductance value per phase; and performing electronic interleaving of carrier signals of the plurality of slices, based on the plurality of control signals and a phase shift value, the phase shift value determined based on a number of the plurality of slices to be interleaved.

In an embodiment, the equivalent leakage inductance value is determined based on one or more parameters of the multi-winding transformer In an embodiment, the method further comprises: determining a first current output by a first set of the plurality of slices and a second current output by a second set of the plurality of slices; and controlling a first inductance coupled to an output of the first set of the plurality of slices and a second inductance coupled to an output of the second set of the plurality of slices based on the first current and the second current.

In another embodiment, an apparatus comprises: a regenerative controller for a power converter including a plurality of modular power units each including one or more slices each having a transformer and a plurality of power cubes, the regenerative controller to enable a regeneration of power to a utility connection coupled to the power converter.

The regenerative controller may include: a transformer model logic to generate a leakage inductance value for the transformer, based on one or more parameters extracted from transformer; a DC controller to generate a DC control signal based on a DC voltage of a DC bus of one of the plurality of power cubes; a first transformation logic to receive a voltage of a primary side of the transformer and to generate a first phase value and a plurality of measured voltage signals; and a second transformation logic to receive a current of a secondary side of the transformer and to generate a plurality of measured current signals.

In an embodiment, the regenerative controller further includes: a first combiner to receive the DC control signal and a first measured current signal and to output a first sum signal; a first proportional-integral (PI) controller to receive the first sum signal and the leakage inductance value and to output a first PI signal; and a second combiner to combine the first PI signal, a cross-coupling correction value, and a first measured voltage signal to generate a first reference voltage signal.

DETAILED DESCRIPTION

Figure 1A:
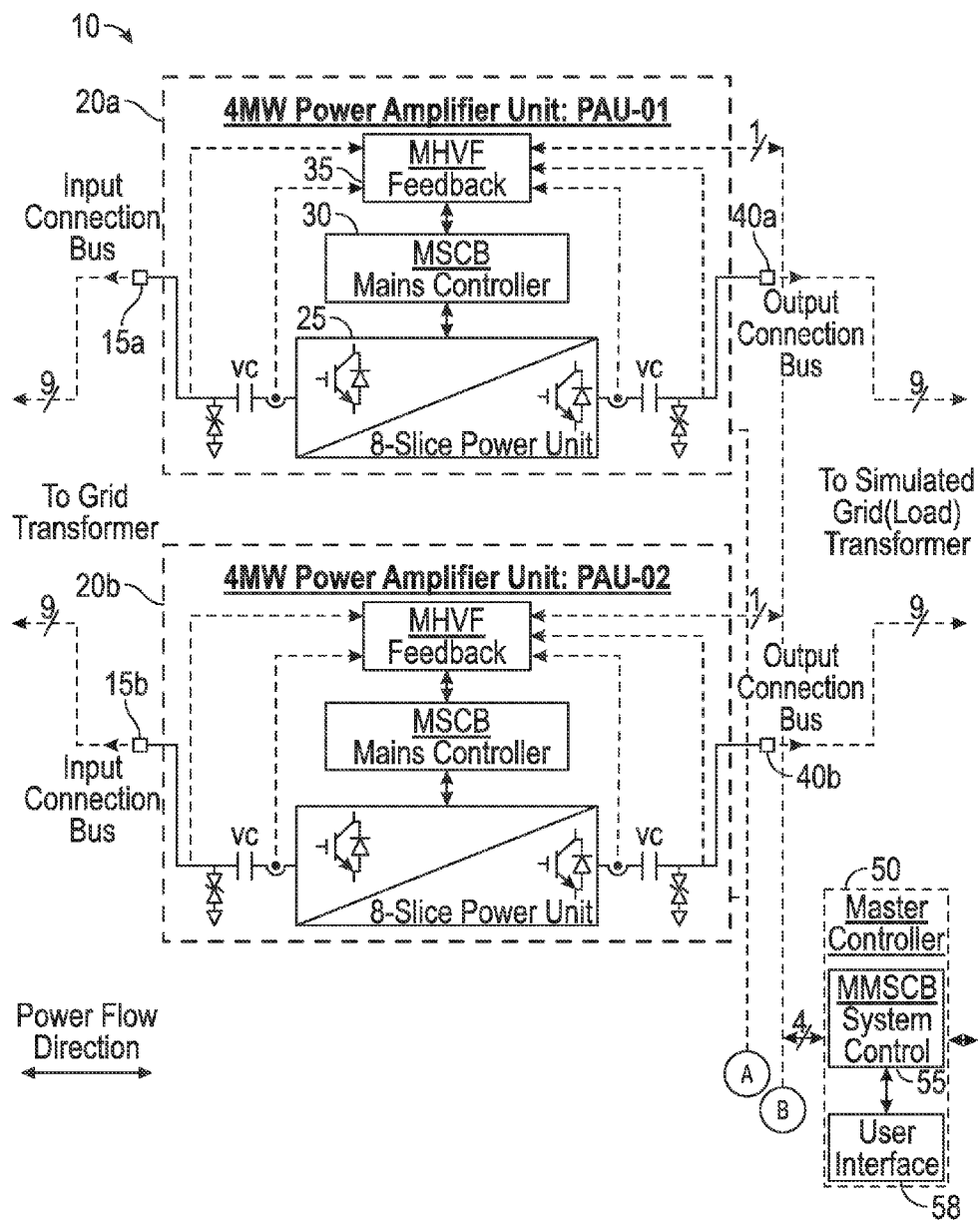
FIGS. 1A and 1B are configuration diagrams of a multi-megawatt power amplifier system in accordance with an embodiment of the present invention.
Figure 1A:
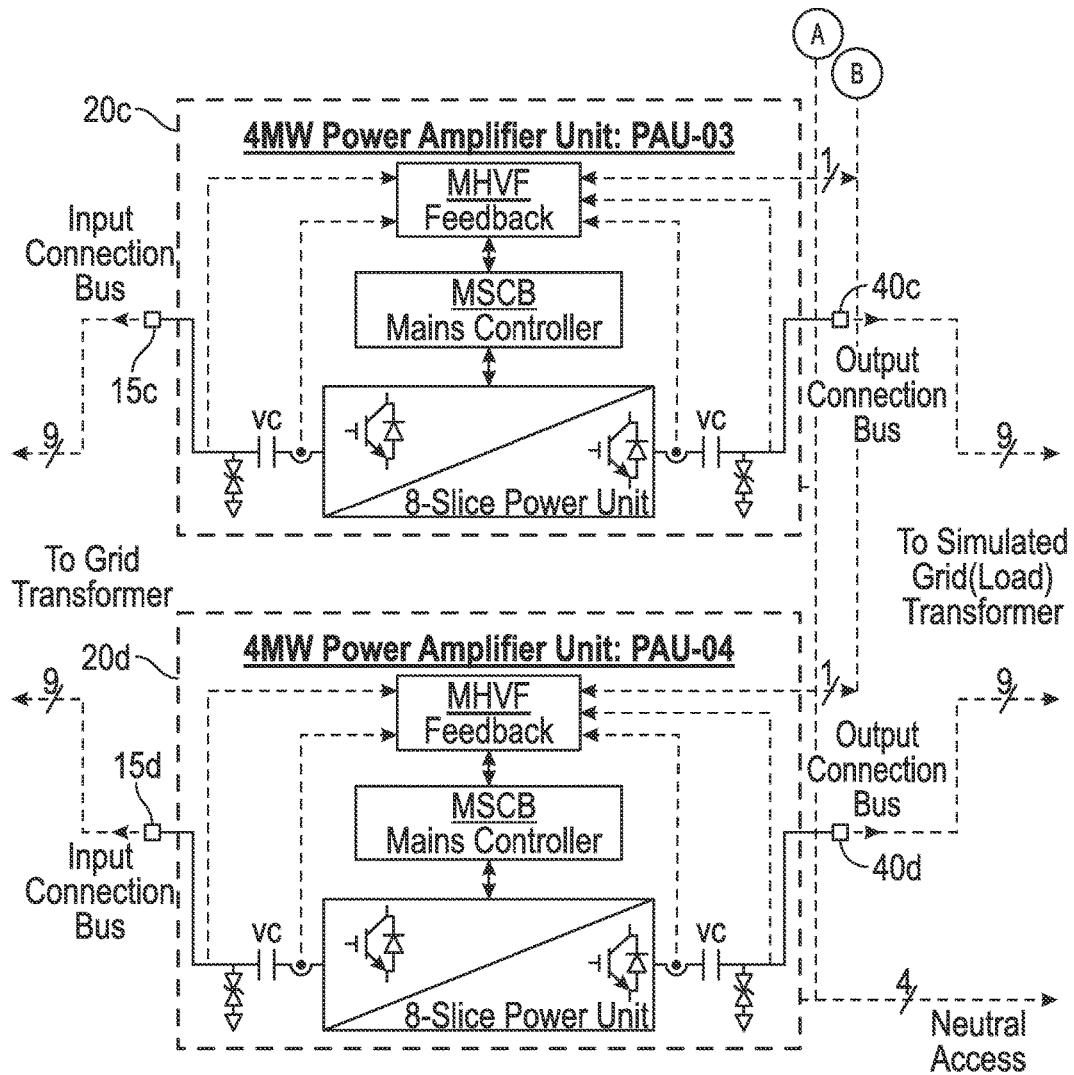

A configuration diagram of a multi-megawatt power amplifier system in accordance with an embodiment is shown in FIG. 1A. The system is composed of four 3.75 MVA, 4.16 kV power amplifier units (PAU) $20_a$-$20_d$, whose specifications for one embodiment are listed in Table I. In one application, four PAUs 20 are configured to respond as a single conversion system capable of processing 15 MVA, 60 Hz power hi-directionally between a utility grid and a load grid through 24/4.16 kV step down transformers (not shown) Three-phase active front end (AFE) rectifiers process this power via an isolated DC bus architecture. Each AFE input is connected to a secondary wye-delta multi-winding transformer. Power from the DC buses is processed via cascaded IGBT inverter stages and delivered to the output grid. In an embodiment, this power delivery may be effected using 4.16/24 kV step up transformers. In the same fashion, the system can regenerate power from the load grid to the utility grid. For applications where full regenerative capability is not needed, PAUs may be designed with passive rectifier stages and partial regenerative front end stages.

TABLE I

PAU SAMPLE SPECIFICATION PARAMETERS

| Parameter | Value |
|---|---|
| Power | 3.75 MVA |
| Input Frequency | 60 Hz |
| Primary voltage | 4.16 kV |
| Secondary voltage | 620 V |
| Maximum output voltage | 740 V |
| DC bus nominal voltage | 1100 V |
| AFE switching frequency | 2.0-6.0 kHz |
| Inverter switching frequency | 600 Hz |
| Maximum output current | 300 A |
| Power electronics cooling | Liquid/$H_2O$ |
| Transformer cooling | Air/liquid |
| Number of SLICES | 8 @ 4.16 kV |

As shown in FIG. 1A, system 10 provides for a plurality of power amplifier units $20a$-$20d$ coupled between a grid transformer at a utility input connection (not shown for ease of illustration in FIG. 1A) and a load transformer (also not shown for ease of illustration in FIG. 1A). Also understand that while the embodiment of FIG. 1A represents an experimental design in which the system is coupled to a simulated grid (load), understand that this simulated or experimental load may equally be replaced with any of a variety of loads in other embodiments such as synchronous, induction, and PM machine or machine drives or other industrial loads such wind turbines, PV systems and so forth.

As further illustrated in FIG. 1A, each of the PAUs 20 may be switchably coupled between an input side grid and output side grid via respective input connection buses $15a$-$15d$ and output connection buses $40a$-$40d$. In an embodiment, these connection buses may be implemented via one or more contactors. With further reference to FIG. 1A, note that each PAU 20 includes a multi-slice power unit 25 (which in an embodiment may be configured as an 8-slice power unit), a mains controller 30 and a feedback unit 35. Note that feedback unit 35, which may be a feedback conditioning system, may receive feedback from various points within the PAU, including input and output of power unit 25 as well as being directly coupled to mains controller 30, which in turn may control operation of the power unit 25. Note further the presence of input-side and output-side means of electrical isolation such vacuum contactors as shown in PAU 20. In an embodiment this output/input means of connection may be configured using other types of protection devices but not limited to circuit breakers. Note also the presence of input/output voltage surge protection circuits within the PAUs.

As further shown, each of PAUs 20 may be coupled to a master controller 50 including a system controller 55 and a user interface 58 to enable a user to interact with the system. As seen, in turn master controller 50 couples to the feedback units 35 of each of the PAUs. In an embodiment, PAU 20 may function as megawatt power electronic building block to configure large power conversion systems when controlled by a master controller 50.

The term power amplifier is used to emphasize the ability of this topology to synthesize output power in incremental steps to realize multi-megawatt power levels. Each power amplifier unit 20 is designed to operate independently or slaved into other larger configurations as described in the present application. This process involves the integration of several other power conversion modules, traditional PWM modulation, and control schemes. Based on this implementation approach, PAUs are able to produce outputs with desired power quality requirements such as improved THD, power factor, and transient response, and availability at these power levels.

The system shown in FIG. 1A can control the load grid in either an open loop or closed loop mode of operation. During open loop control, the PAU system injects or extracts power from the load grid, following commands originated by mains controller 30 located in each PAU. In closed loop control, the PAU system may receive control commands directly from an external controller run by a sophisticated computer architecture to emulate real time responses of a simulated electric power grid to control a hardware in a loop process (not shown), or from a controller for vector control based schemes, integrated in a master controller 50 in this application. In a simulated grid option type of load, the PAU will emulate the real time system responses for a device under test interacting with a modeled power grid. Either operating mode (closed or open loop) may implement V/Hz control for each cascaded IGBT inverter stage of the PAU. Either operating mode (closed or open loop) may implement V/Hz control for each cascaded IGBT inverter stage of the PAU. In other applications such as controlling a physical utility grid load, or an AC machine drive load, the PAU system output may be controlled in a closed loop fashion using vector control schemes to provide or extract power from the load. The regenerative control scheme $20_a$-$20_d$ remains as described in this application. Note that in other embodiments, control commands may be directly input by a user for a manual control mode or automatically under a control application mentioned before such as of a given physical load to which the system is coupled.

Figure 1B:
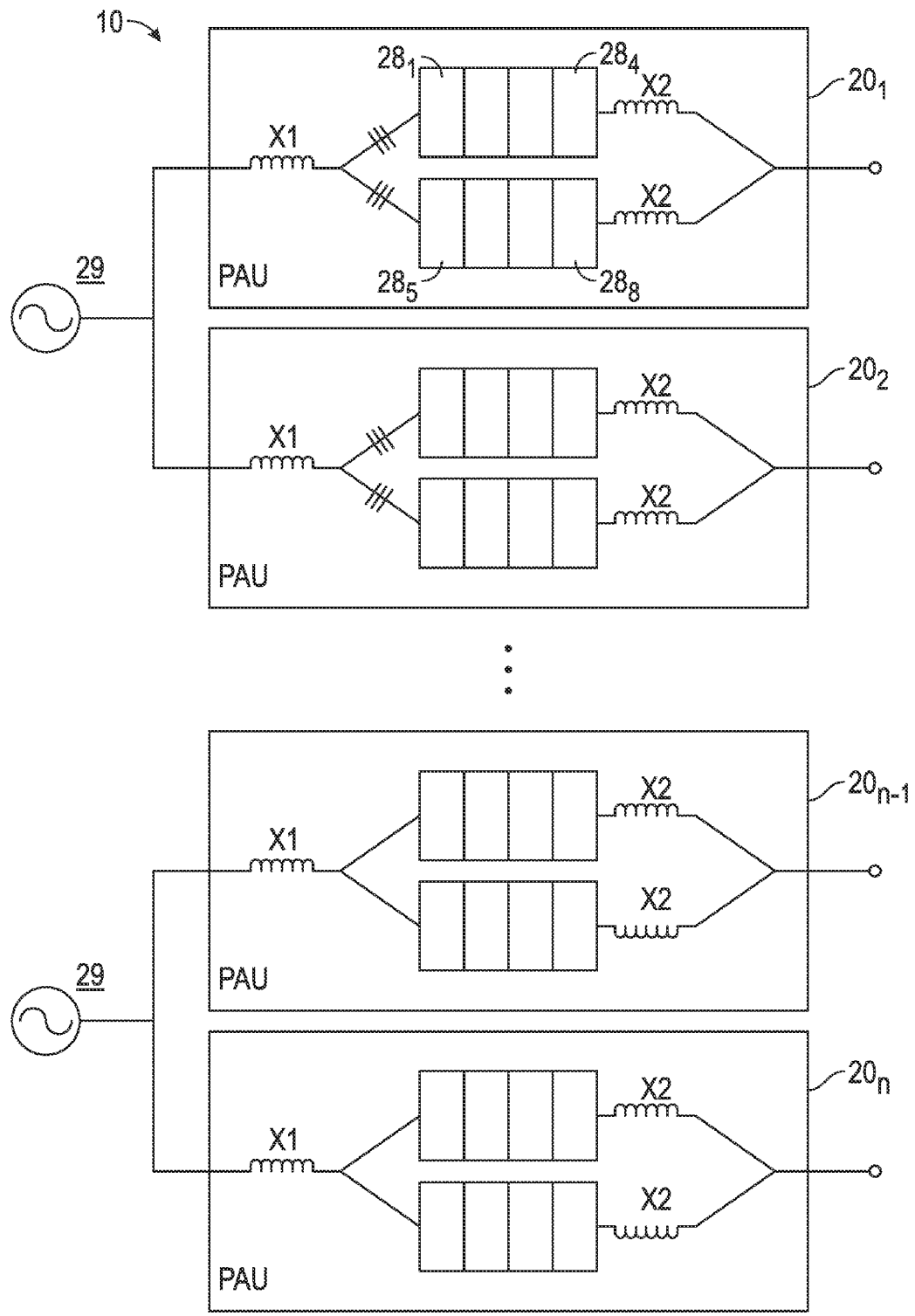

The foundational building block of this modular system is the PAU. These grid connectable power conversion products share the same building blocks and are field configurable to scale power. Referring now to FIG. 1B, shown is a block diagram of further details of a system in accordance with an embodiment. FIG. 1B schematically represents system 10 of FIG. 1A. However, here in the implementation detail shown, multiple parallel sets of series-coupled slices or branches are present within each of the PAUs. In the embodiment shown in FIG. 1B, assume that each PAU includes 8 slices $28_1$-$28_8$. These slices may be segmented into 2 parallel sets of 4 series-connected slices ($28_1$-$28_4$ and $28_5$-$28_8$) to provide redundancy both within a PAU and as a system in which one or more of the PAUs can be controlled to be selectively disabled.

Further shown in FIG. 1B, incoming utility power is provided through corresponding input transformers 29 to multiple PAUs. Understand that while shown with this particular connection scheme, in other embodiments an independent transformer may be provided on the input side of each PAU. Furthermore, understand that more than 2 PAUs may couple to a single input transformer.

In each PAU, an input inductance X1 may be provided. In various embodiments, this input inductance X1 may be a very small valued intentional inductor on the order of between approximately 0.005 and 0.020 milli-henries. Inductance X1 may provide capability for an implementation of a dedicated active input current sharing control among PAUs or further improvement of input THD. The preferred embodiment will use no additional X1 since the extracted slice equivalent leakage inductance from the multi-winding transformer can be used for such purposes as explained below. This is so, as each of the slices includes a transformer which may provide the amount of inductance usually required for these applications. In this way, the need for large primary inductors can be avoided. Also shown in FIG. 1B, the output of each of the series-coupled sets of slices couples to an output inductance X2. In various embodiments, these inductances may be used to enable passive balancing of the current output among PAUs by the series-connected slices. In other embodiments, inductance X2 can be used to provide dedicated active output current sharing control. Thus based on the current output by each of the slice sets, the values of individual inductors X2 may be variably controlled to maintain the current outputs substantially equal. In some embodiments, output inductances X2 may be on the order between approximately 0.005 and 0.020 milli-henries. Furthermore, while the inductances may be substantially equal in some embodiments, in other embodiments, the inductances may be controlled to be of variable values. This is particularly so in situations where one or more of the PAUs is to be disabled. Understand that the intentional equivalent reactance of inductors X1 and X2 can be distributed within each slice and/or power cube within a particular PAU and not limited to only external PAU locations.

Note that with multiple slice outputs coupled in series for each of multiple parallel branches within a PAU, redundancy is provided. For example, for each of the branches shown in FIG. 1B (e.g., branches formed of slices $28_1$-$28_4$ and $28_5$-$28_8$), 100% power can be realized even when one of the slices is disabled, e.g., due to a failure, as the fourth slice of each branch provides a measure of redundancy. Of course additional series-coupled slices may be present and greater or smaller amounts of redundancy can be realized in different embodiments.

Figure 2A:
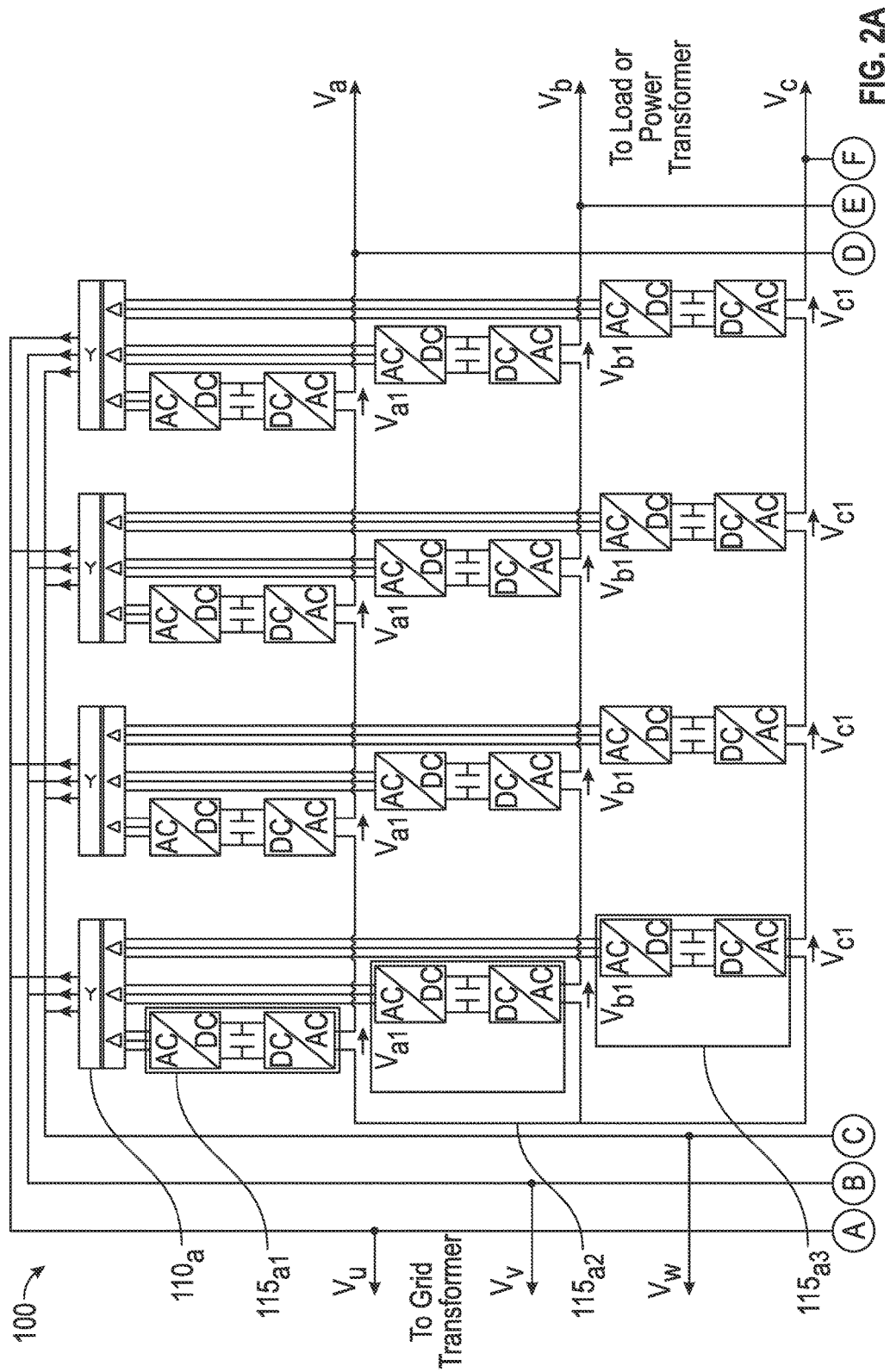
FIGS. 2A and 2B are diagrams of power conversion slices of a power amplifier unit in accordance with an embodiment of the present invention.
Figure 2A:
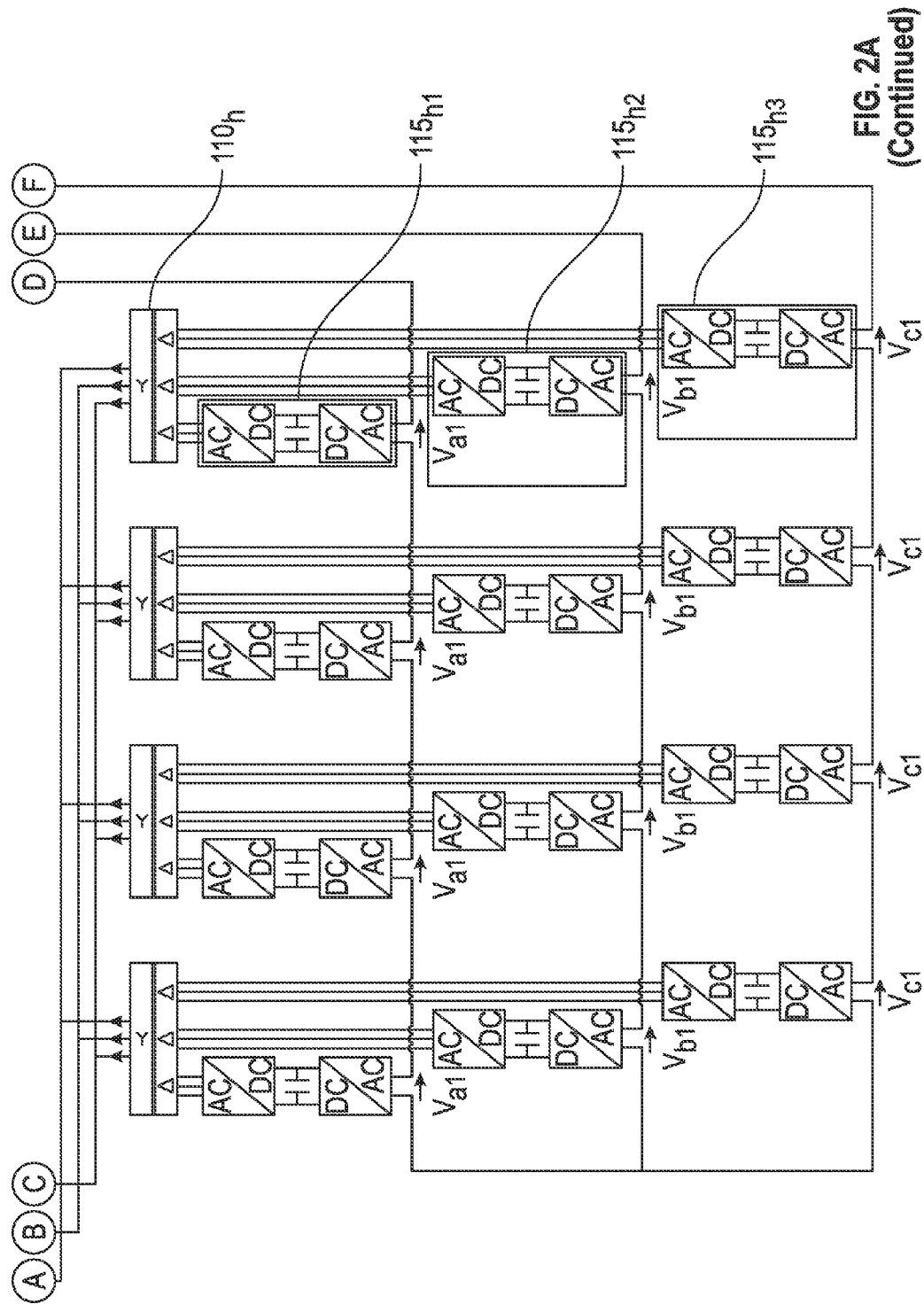

A representative 3.75 MVA, 4.16 kV PAU connection schematic is shown in FIG. 2A. As shown in FIG. 2A, a PAU 100 includes a plurality of slices coupled in parallel between an input side and a load side. More specifically in the three-phase implementation shown in FIG. 2A, three phase input lines and three phase output lines are present (namely input lines $V_u$-$V_w$ and output lines $V_a$-$V_c$). Also, each slice is formed of a corresponding transformer $110_a$-$110_h$ to which is coupled three phases of power conversion modules $115_{a1}$-$115_{a3}$-$115_{h1}$-$115_{h3}$.

As seen in FIG. 2A a PAU is composed of eight slices, which are smaller power conversion modules (and which themselves are formed of multiple power conversion modules (which are referred to herein as cubes)), and a mains cabinet (not shown) where the system control, sensing, and protection functions reside. Slice and mains concepts are presented later. The PAU also integrates input and output contactors (not shown) for power connections. The contactors provide flexibility to this modular configuration. These components facilitate maintenance, testing, and enable flexible power flow through PAUs. Contactors allow addition or subtraction of several MW of power to or from the grid. Therefore, PAUs can be operated as redundant bi-directional power converters in large power configurations. PAUs possess independent diagnostics, but have the ability to follow a single system control command.

The mains cabinet may include system control and the input and output contactors. A PAU typically includes one mains cabinet and at least one slice assembly. Communication is implemented via fiber optics, and protocols associate data priority with timing in an embodiment. Note that the mains cabinet can provide subsystem or system control. Control power is provided through mains cabinet and is distributed to each slice at 480/230 V, in an embodiment.

Figure 2B:
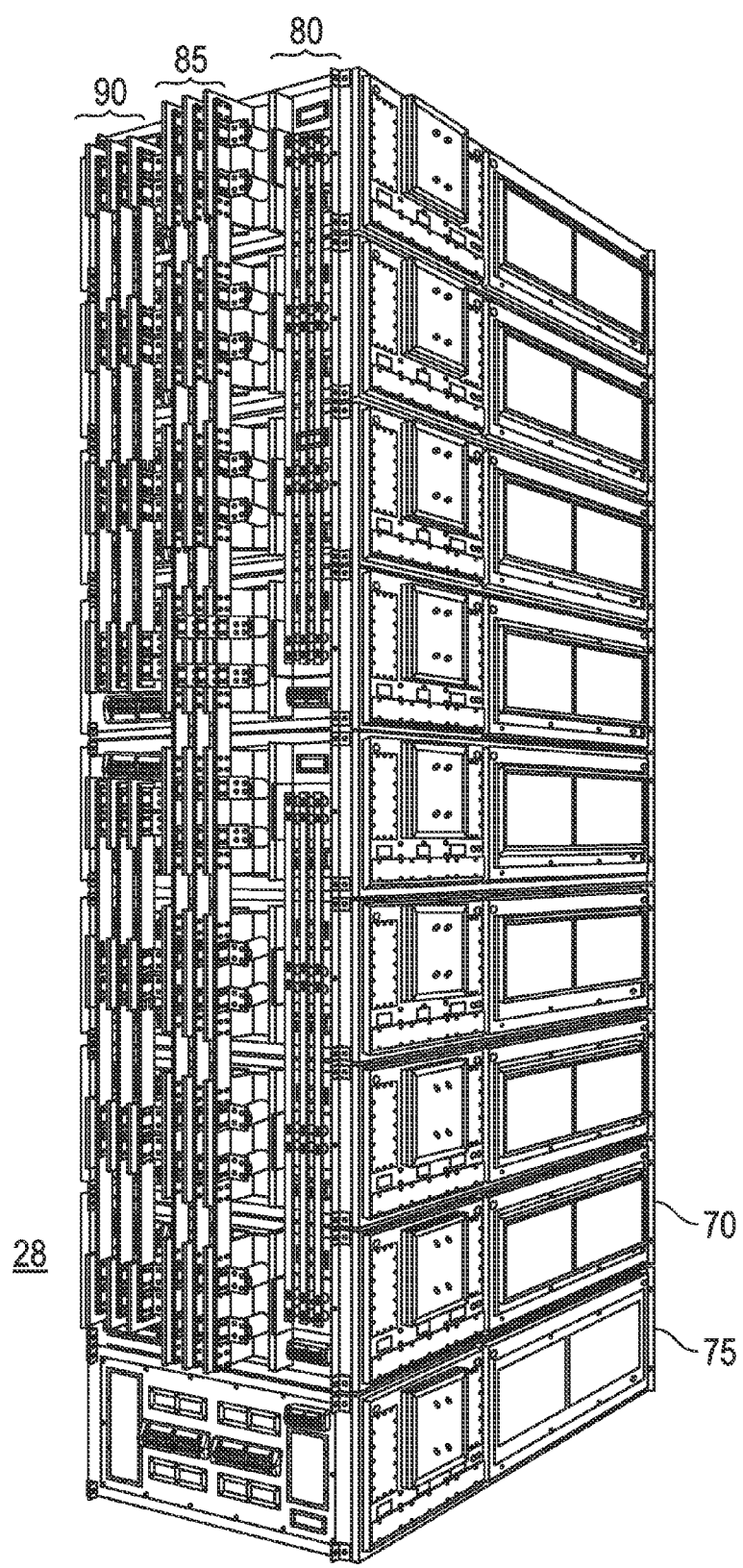

Referring now to FIG. 2B, shown is an illustration of a power amplifier unit implementation accordance with an embodiment. In the embodiment shown in FIG. 2B, the modularity of a PAU is illustrated. As seen, slices 28 of the PAU may each be housed within a corresponding separate modular cabinet 70 that includes the components of the slice (namely a transformer, and multiple power conversion units, e.g., each implemented as a cube adapted within a corresponding insulation unit of the cabinet). In turn, a coupling between the various slices of the PAU (both series connected slices and parallel connections of branches including series-connected slices can occur via a bus located on a portion of the cabinet. As further illustrated in FIG. 2B, a separate cabinet 75 may be provided as a mains controller for the multiple slices.

In general, a first set of buses 80 are provided for each of the series-connected sets of slices to provide control signaling. In an embodiment, these buses may operate at 480V. In addition, fiber-optic signaling regarding sensing, diagnostics and other information also may occur via the bus. In turn, an input bus 85 is provided to all the slices, e.g., from an input transformer. While shown as a single bus coupling all of the slices together in parallel, in other embodiments individual slices or smaller set of slices may be coupled to different input transformers. Finally, a set of output buses 90 provides output from the 2 sets of series-connected slices.

Figure 3:
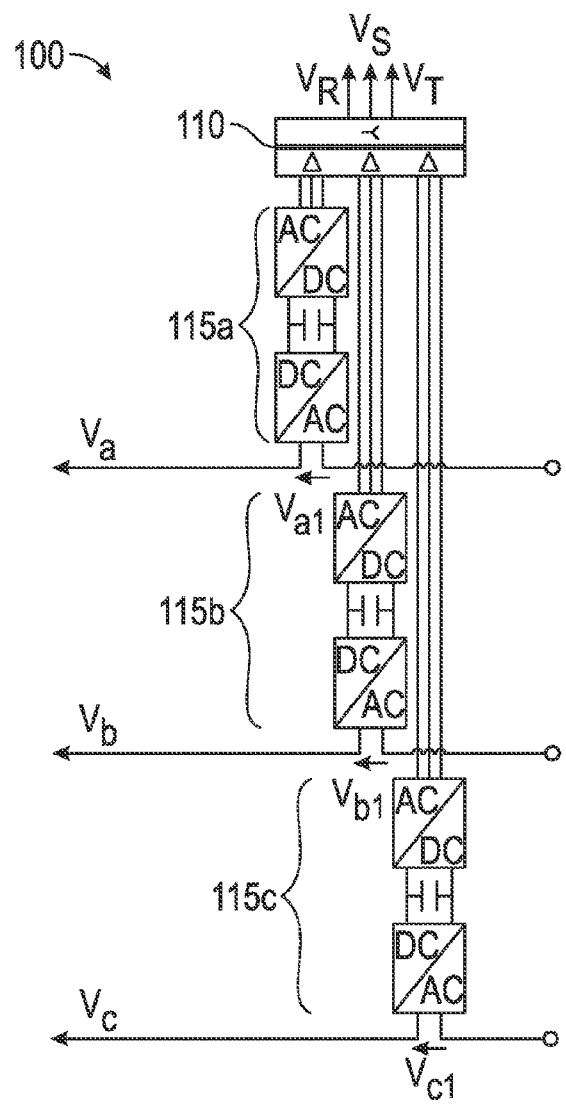
FIG. 3 is a slice schematic in accordance with an embodiment of the present invention.

A slice schematic is shown in FIG. 3. The slice design used in one embodiment is a 550 kVA power section configured into the PAU at a megawatt scale. Slices are designed to be connected in the field. As shown in FIG. 2A, eight slices can be connected as two sets of ~2 MVA sections in parallel to realize a 3.75 MVA power amplifier unit at 4160 V. The term slice is used to emphasize the simplicity and capability to configure and scale power in the field. In an embodiment, a slice cabinet 100 includes a wye-delta 4.16 kV/620 V multi-winding transformer 110, three regenerative power cubes 115a-115c for power processing, local control, sensing, protection capability, and a liquid cooling system based on R134A cooling medium and coupled to external heat exchanger (not shown in FIG. 3). Power transformers are designed to provide visible voltage insulation. The transformer insulation is fixed, but the flexible design easily allows for scalability on system insulation. Transformers may be either shielded or un-shielded. Transformer cooling system may be based on air, water, or two-phase cooling medium. The preferred cooling system may be two-phase cooling for one application.

Figure 4:
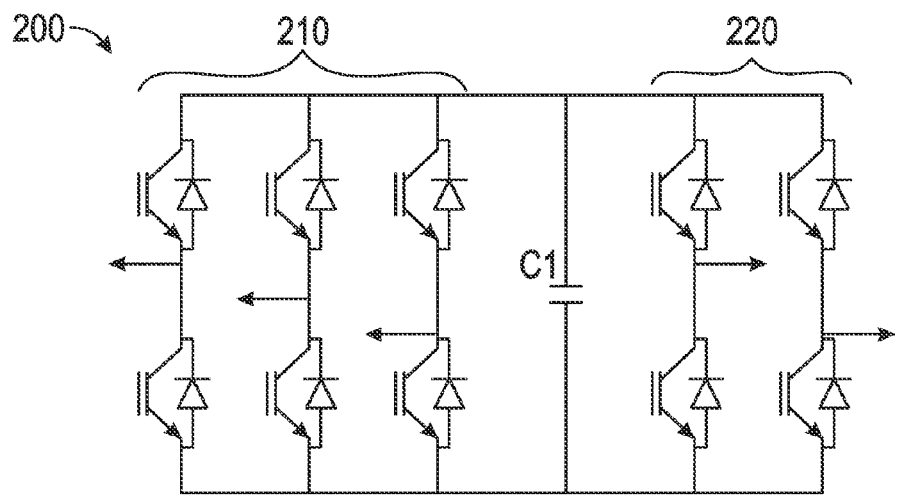
FIG. 4 is a cube schematic in accordance with an embodiment of the present invention.

A cube schematic is shown in FIG. 4. Cubes are basic power conversion modules located within each slice and are based on a well-known two-level regenerative AC/DC/AC conversion topology. As seen in FIG. 4, a cube 200 includes a first set of IGBTs 210 which may act as an active front end (AFE) and to perform AC to DC conversion. IGBTs 210 couple to a DC bus including a capacitor C1 that in turn is coupled to a second set of IGBTs 220 that forms an H-bridge inverter. Further details regarding a power cube (also referred to as a "power cell") may be found in U.S. Pat. No. 8,279,640, the disclosure of which is hereby incorporated by reference.

Thus as seen in FIG. 4 a cube includes an AFE, a DC bus, and an inverter, where the AFE and inverter are implemented using IGBTs, and the DC bus with a capacitor, as shown. In the previously described slice, each cube is fully regenerative and uses five liquid cooled IGBT dual modules arranged as a three-phase AFE and a single phase H-bridge inverter. Cubes may be designed and fabricated with high dielectric insulation. A 15 kV dielectric insulation rating is provided by a 'bubble' in an embodiment. The bubble design is a multi-layer insulation system that encircles each power cube. Finally, each cube includes fiber optic communication, with local control, monitoring, and protection functionality.

Redundancy is a characteristic for a modular design approach. The system shown in FIG. 1A can function as redundant system by having the capability of using each power amplifier module as a redundant component. Power will continue to flow if one, two, or three PAUs are off-line. Safety is enhanced by providing independent diagnostics and protection on each power conversion module at the PAU, slice, and cube levels.

Figure 5:
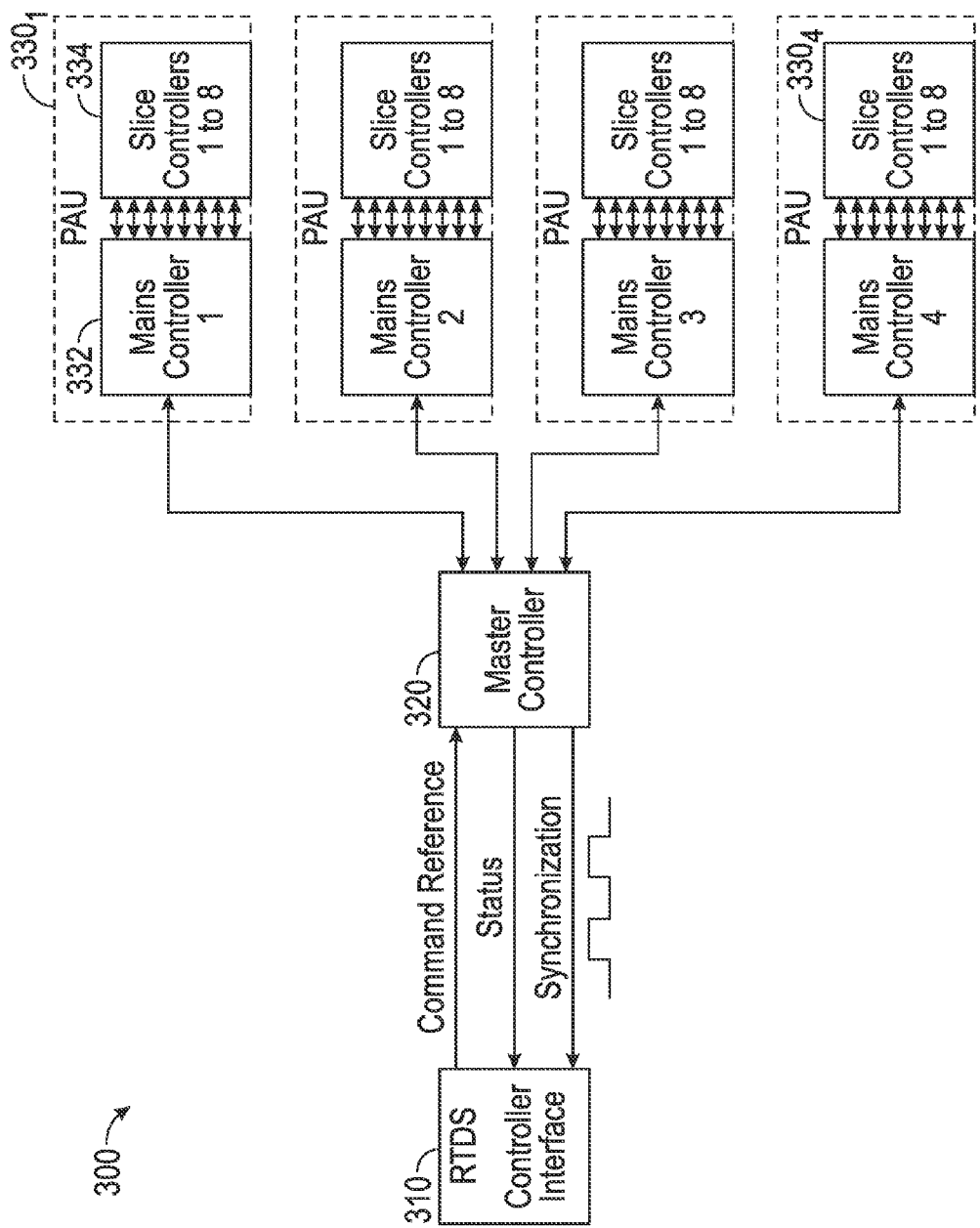
FIG. 5 is a distributed and modular control platform in accordance with an embodiment of the present invention.

Distributed and modular control platforms are provided within each power conversion section. FIG. 5 shows the distributed and modular control platform used in a preferred embodiment. As seen in FIG. 5, a platform 300 includes a controller interface 310 that communicates command reference information to a master controller 320 and receives status and synchronization information from the master controller.

Still referring to FIG. 5, master controller in turn communicates with a plurality of PAUs 330$_1$-330$_4$. Although only four PAUs are shown for ease of illustration, understand that in a given implementation, more than four such PAUs may be present. As seen, each PAU includes a mains controller 332 and a plurality of slice controllers 334. Of course understand that each PAU may include multiple slices as discussed above. This design control approach is established in each cube, slice, and mains units. In a preferred embodiment, the overall system controller may be implemented in the mains cabinet. Each slice contains local control for interfacing and managing fiber optic-based signals from the mains to each slice and within the slice to each power cube. Slice control also translates vector command signals from the mains control to appropriate IGBT commands for each cube and manages signal monitoring, protection, and cube status information to the mains control.

The mains controller is composed of a processing unit and high voltage feedback (HVF) interface. The HVF interface collects information from power amplifier voltage and current sensors, and provides a fiber optic interface to the system control section. System control performs vector control calculations based on information received from each slice and HVF interface. A user interconnection section provides PLC terminal interface, local keypad/HMI, PC and network connections.

Figure 6:
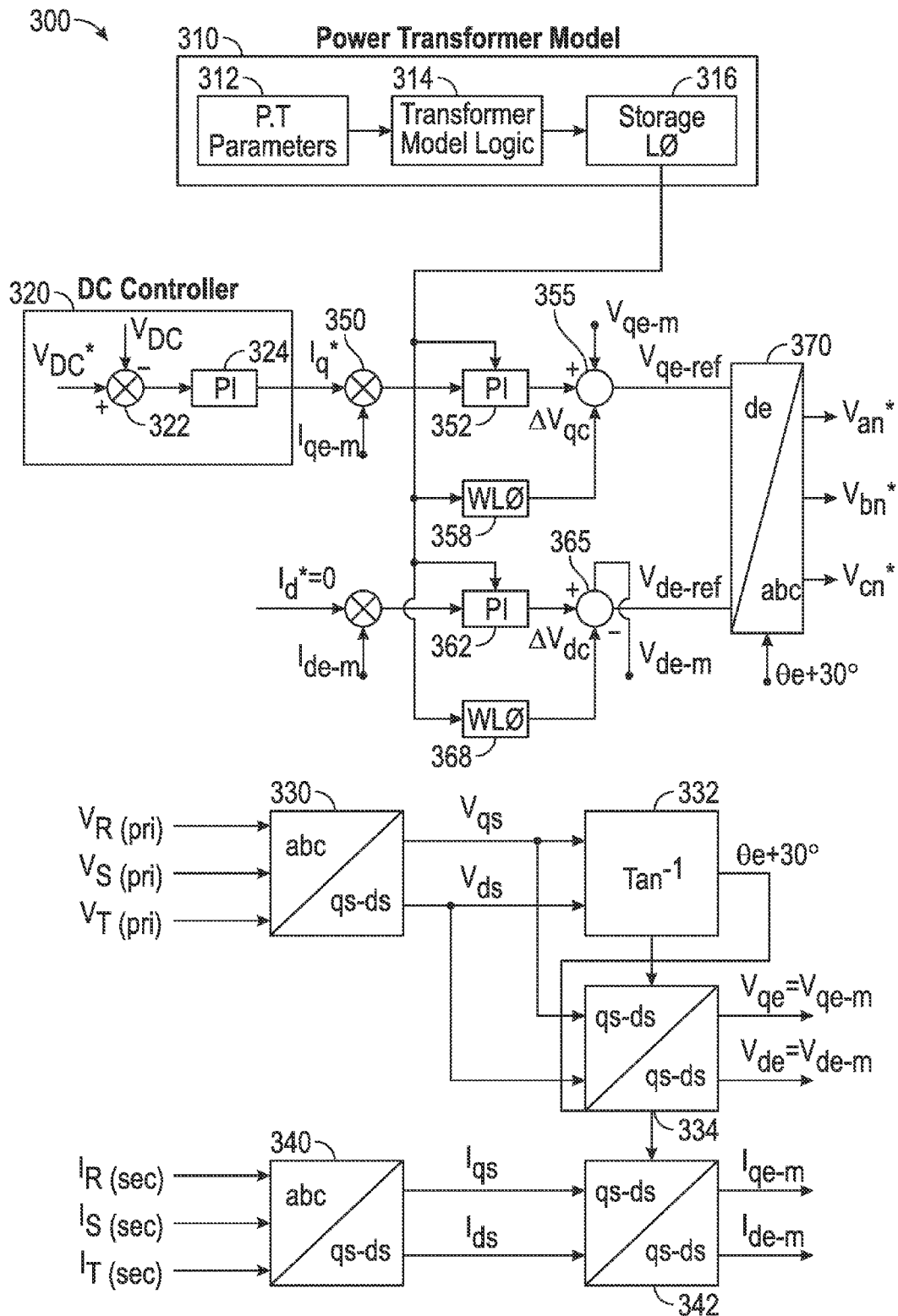
FIG. 6 is a block diagram of a regeneration controller in accordance with an embodiment of the present invention.

As discussed above, a power amplifier unit system can be controlled to enable regenerative operation in both open and closed loop modes. Referring now to FIG. 6, shown is a block diagram of a regeneration controller in accordance with an embodiment of the present invention. As shown in FIG. 6, regeneration controller 300 may be implemented in various hardware of a system such as one or more processors, controllers or other logic that receives measured inputs and other diagnostic information, to generate control signals for a corresponding power conversion module. In an embodiment global or system regeneration operation may be provided by implementing a regeneration controller for each AFE cube in each slice of a system. To enable cube regeneration, embodiments may allow control of a DC-bus voltage of the cube by allowing independent control of the active and reactive input cube current components to produce a control set of active and reactive voltage components to generate a 3-phase reference voltage set Van*, Vbn*, Vcn* from measurement at the primary of the slice transformer. This 3-phase voltage reference set is used to provide PWM gate signals to each IGBT of the AFE cube. In addition, the leakage inductance of the multi-winding transformer is extracted from an equivalent model block 310. From power transformer parameters 312 a transformer model is generated in a logic 314, and from this model, a secondary equivalent leakage inductance L0 per phase is synthesized and stored in a storage 316. In an example, this L0 value may be on the order of between approximately 200 and 400 micro-Henries. Then, L0 is used to affect each proportional integral controller and cross coupling blocks in controller 300 to create the correct dynamic outputs to actively regulate the DC bus of each cube.

As shown in FIG. 6, regenerative controller 300 includes a power transformer model 310. In general, power transformer model 310 may receive various parameter inputs from a corresponding transformer which in an embodiment is the slice input transformer of a corresponding slice. Parameters that may be extracted from the power transformer include, for example, effective turns ratio between primary and secondary windings, equivalent secondary leakage inductance between primary and each secondary winding, sum of all secondary winding currents referred to the primary side, voltage gains between different pairs of windings when other windings are short circuited, and self-inductance per phase referred to the primary side. This information may be provided to generate a model of the transformer corresponding to a modeled inductance L0, which may be stored in storage 316. As discussed further herein, this modeled inductance, which corresponds to an equivalent leakage inductance per phase of the transformer as viewed from the secondary windings of the transformer, may be used in providing regeneration control. Note that L0 can be a configured value that is fixed on design (as a result of transformer modeling) or a variable value based on actual operating parameters of the transformer. With this equivalent inductance, an intentional input inductance may be eliminated or at least reduced. For example, L0 allows regeneration control in accordance with an embodiment of the present invention without the addition of extra physical inductance between cube and transformer secondary windings, eliminating or minimizing X1 as discussed in FIG. 1B.

Still referring to FIG. 6, a DC controller 320 is present. In general, DC controller 320 generates a control signal based on a measured voltage corresponding to a DC voltage in a cube of a given slice. For example, the DC bus voltage Vdc of a given cube may be measured and provided to a combiner 322 along with a voltage command signal Vdc*. In turn, combiner 322 generates an output provided to a proportional-integral (PI) controller 324 that generates a control signal Iq*, provided to a combiner 350.

Additional system parameters may be measured, including voltage signals from the primary side of the transformer. Thus as seen, incoming voltage signals $V_R$-$V_T$ from the slice transformer are provided to a first transformation unit 330 that transforms the three-phase stationary signals into a 2-phase orthogonal stationary reference frame having qs and ds components to output corresponding voltage signals Vqs and Vds. In turn, these signals are provided to another processing unit 332 that processes these signals to determine the electrical phase angle $\Theta e$ of the rotating primary supply voltage. Note that 30 degrees are added to $\Theta e$ to account for secondary delta connection winding. In an embodiment, transformation unit 332 may be implemented using a $\tan^{-1}$ function. However, understand the scope of the present invention is not limited in this regard and in another embodiment, transformation unit 332 may be implemented as a phase lock loop.

The two-phase voltage signals Vqs and Vds are further provided to yet another transformation unit 334 that transforms the signal to another reference frame, namely a synchronous reference frame, to generate measured voltage signals Vqe-m and Vde-m.

Note that similar transformations of incoming measured current signals from the secondary side of the transformer may further be processed in transformation units 340 and 342 to generate measured current control signals Iqe-m and Ide-m.

Still with reference to FIG. 6, combiner 350 receives control signal Iq* from DC controller 320 and measured control current signal Iqe-m and provides an output to a PI controller 352 that further receives the equivalent inductance value L0 stored in storage 316 and calculates a control value ΔVqe according to: $K(L0)+K_i(L0)/s$. This control voltage is provided to another combiner 355 which combines all of the control value, measured voltage signal Vqe-m and an output of a function 358, which generates a cross-coupling value as a function of the equivalent inductance value. Thus combiner 355 generates an output voltage Vqe-ref, which is provided to another transformation unit 370. As also shown in FIG. 6 a parallel processing path occurs with respect to combiner 360, PI controller 362, combiner 365 and function 368 to generate an output voltage Vde-ref, also provided to transformation unit 370, which takes the synchronous reference frame phase values and generates in turn three-phase control values Van*-Vcn*. Understand while shown with this particular implementation in the FIG. 6 embodiment, other variations are possible.

Figure 7:
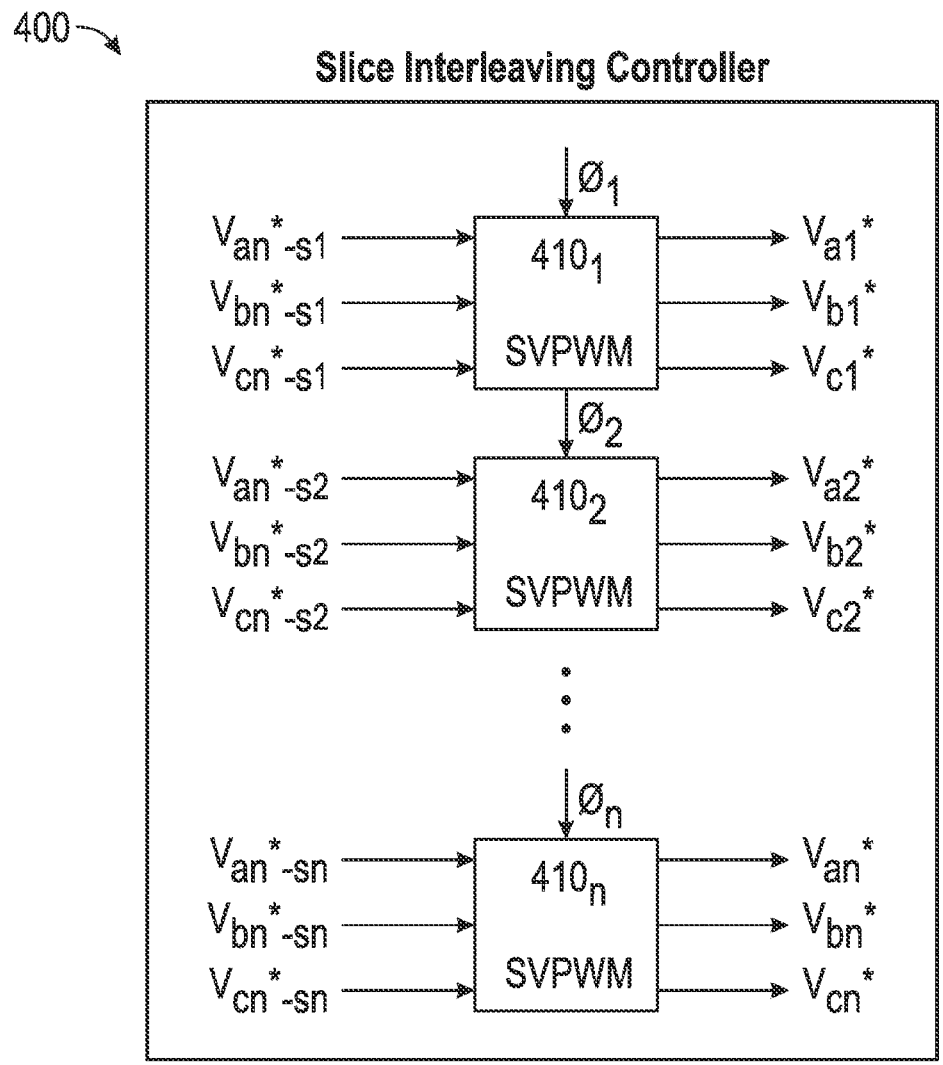
FIG. 7 is a block diagram of an interleaving slice controller in accordance with an embodiment of the present invention.

Referring now to FIG. 7, shown is a block diagram of an interleaving slice controller for providing THD control of regeneration signals for current at the slice transformer primary. As seen, an interleaving controller 400 includes a plurality of PWM logic $410_1$-$410_n$. As seen controller 400 receives control voltages per slice Van*-Vcn* (e.g., from regeneration controller 300), along with value Φ corresponding to a slice carrier shift angle. In turn, a space vector PWM logic 410 for the corresponding slice generates control signals Va1*-Vc1*. Note that the phase value Φ may be generated based on the number of interleaved slices in the input side. For example, with N equal to 4 slices, Φ equals 90° in accordance with the following equation: Φn=360/N where N equals the number of interleaved slices connected to each input phase (e.g., phase A, B or C) of a PAU or PAU-based system and Φ corresponds to the electronic phase shift between two adjacent carriers waveform signals. Note that the carriers are provided per cube on the same phase (e.g., Phase A) on each slice or group of slices. In theory, all cubes connected to the same phase at each secondary of each transformer can be interleaved. The input transformer current THD should decrease to a very small value (e.g., less that 2% ripple), in another embodiment, one cube per slice may be interleaved in an 8-slice PAU, with the other 2 cubes to receive the same signal.

Figure 8:
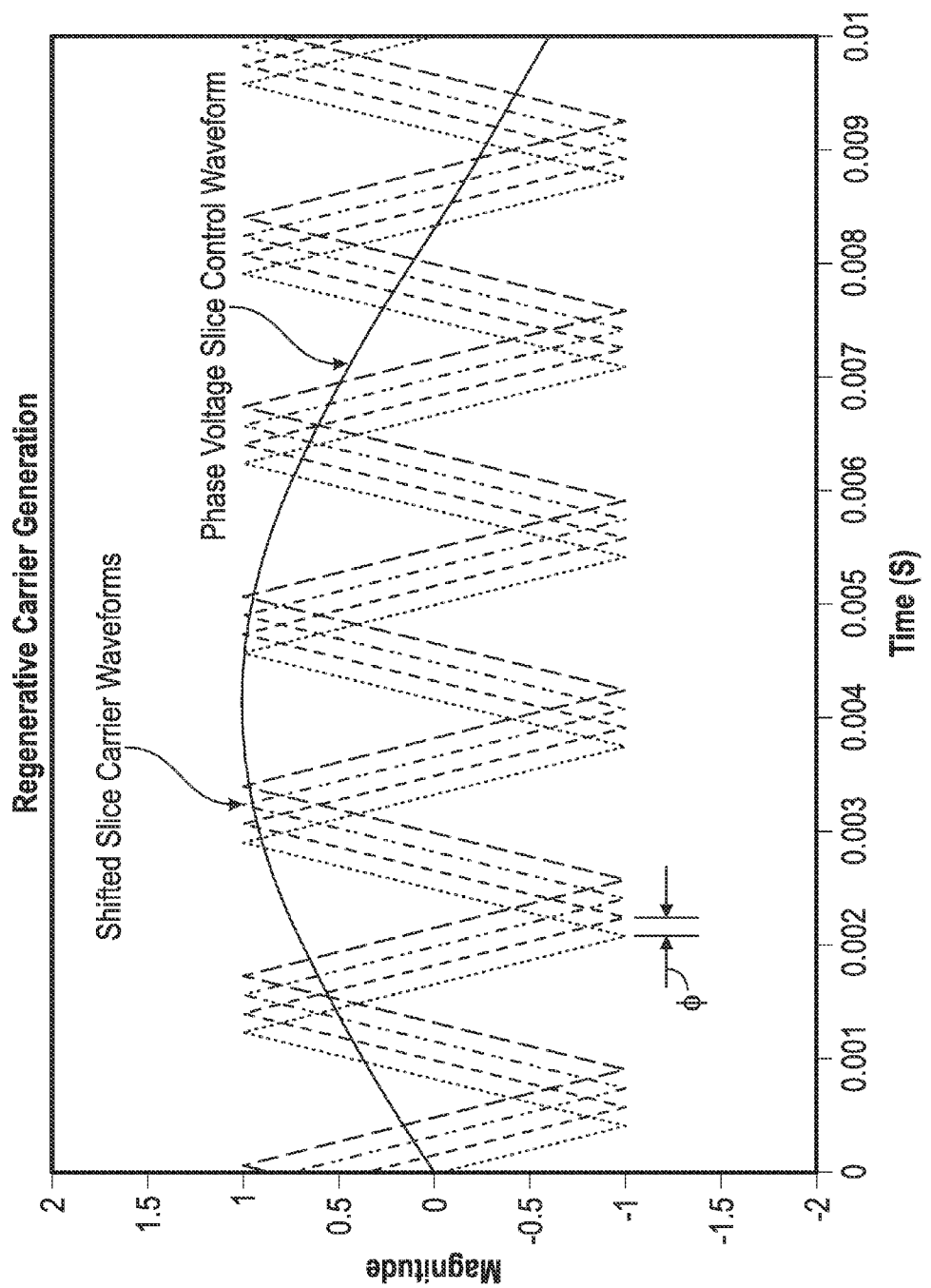
FIG. 8 is a graphical illustration of regeneration carrier generation in accordance with an embodiment of the present invention.

Referring now to FIG. 8, shown is a graphical illustration of regeneration carrier generation in accordance with an embodiment. As seen, each of N slices has a triangular waveform that is a separated in phase from the next slice by Φ, which is the interleaving angle between the regenerative carriers. The switching pattern can be implemented using carrier based schemes as illustrated, or SVPWM strategy. The preferred embodiment uses SVPWM method to generate the switching pattern for each AFE. The switching pattern may be shifted by using angle Φ. In this way, a regenerative voltage Va is provided with a substantially smooth sinusoidal pattern with reduced THD at the PAU input as the THD of phase current Ia is improved dramatically. Also, by providing the regenerative system shown, electronic interleaving of slice carrier signals can improve the input current harmonic spectrum by pushing it to a location N*fsw, where fsw is the switching frequency of the AFE semiconductor devices. For this application the effective converter frequency may be over 24 kHz. With an electronic interleaving control scheme, an input current has minimal THD content, e.g., less than 2%, by interleaving carriers of AFE modules (realizing a sinusoidal waveform without need of additional physical inductance). The voltage THD may be under 10% without the addition of physical filtering, in an embodiment, the control scheme may be performed by electronically phase shifting AFE carriers of each PAU series cube per phase with the purpose of improving input voltage and current waveform THD content.

By performing electronic interleaving, current THD can be reduced without the need of a special power transformer (no winding phase shifting needed) or complex/expensive input filters to correct input current THD. Instead, THD correction is done by software.

In similar fashion, output carrier phase shift is performed on the H-bridge cascaded multilevel inverter. Here only the cubes connected in series are interleaved. Physical testing for the design implementation of the power amplifier was conducted using a motor as a load. The experimental results were measured on a prototype unit using air-cooling for the cubes. A 4160 V, 3000 HP dynamometer was used to evaluate output performance of a cascaded multilevel inverter for this application. Measurement of output current THD was less that 2% and output voltage THD was less than 3%. By combining slices, which increases the number of power cubes per phase in series, a PAU is expected to have similar or better THD values.

Figure 9:
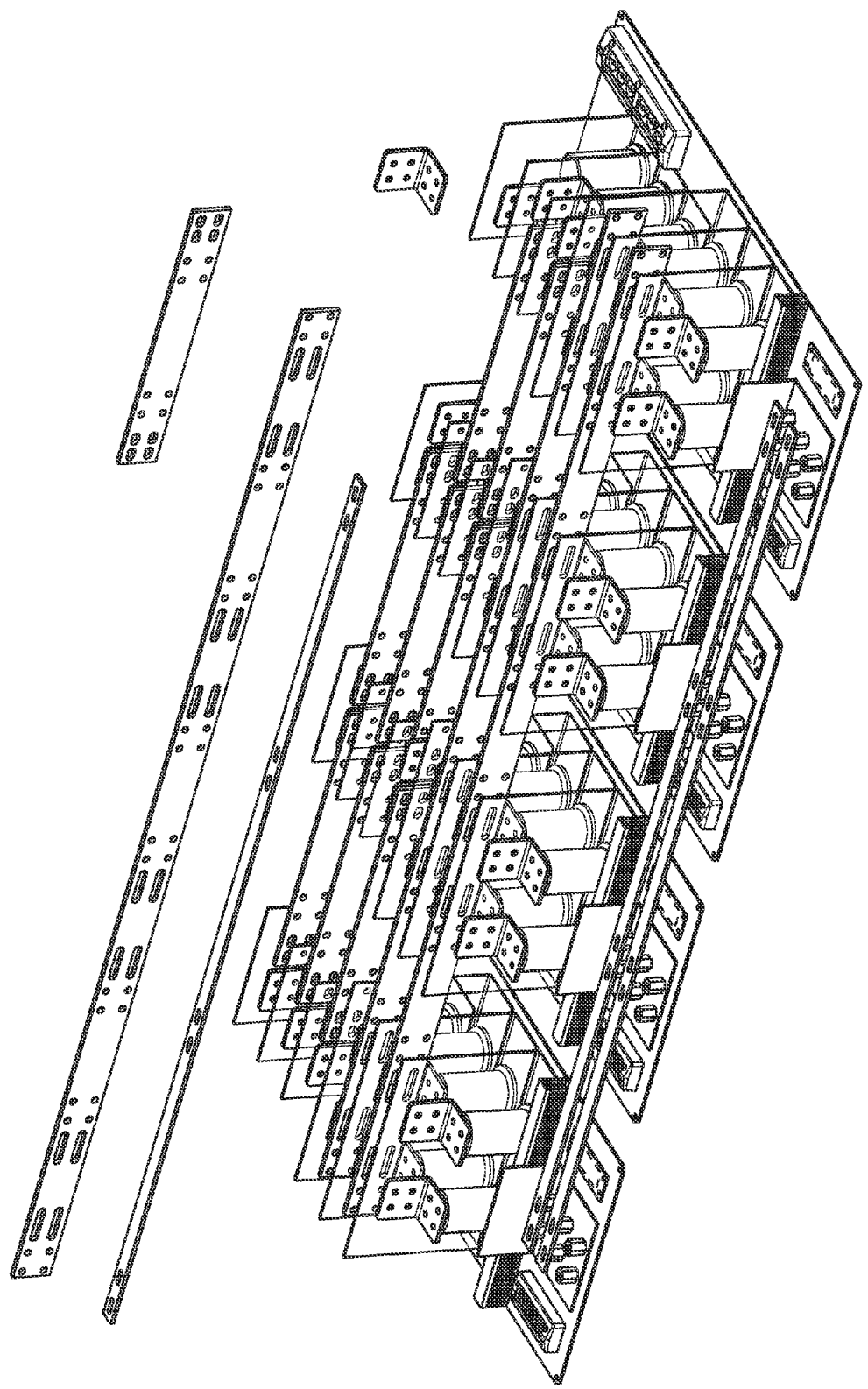
FIG. 9 is an illustration of a power amplifier bus assembly in accordance with an embodiment.

Referring now to FIG. 9, shown is an illustration of a power amplifier bus assembly in accordance with an embodiment. As shown in FIG. 9, a power amplifier bus assembly may be implemented on a roof or a top portion of a cabinet (e.g., on an exterior of the cabinet) to enable ease of access. In this way, simplified configurability can occur in the field, as the need for reconfiguring of cables internal to a cabinet that includes one or more slices can be avoided. This flexible roof bus design enables field configurations for input, output, control power, and communication buses. Furthermore, isolation is provided for high voltage systems (e.g., 13.8 kV). In the example shown in FIG. 9, there are four sections, each one corresponding to a slice of a PAU formed of four slices and a mains cabinet. The mains cabinet is connected by HV cables but not limited to this type of connection. For instance, a different design may include extending the bus system to cover the mains cabinet. This may provide a cleaner way to connect PAU input power and the load. In the case being discussed in FIG. 9, no buses are required to connect to mains. The bus arrangement is for approximately two megawatts capability, where a PAU uses two sets of these buses. The location of bus system is not limited to the top of the PAU. For other type of applications, a bus system may be designed to be located above the slice power transformer and below the power cube section within a slice, in this case, a flexible plug-in lateral connection system may allow power and control interconnections between slices and mains. In other cases, fixed cable interconnections may be utilized.

Figure 10:
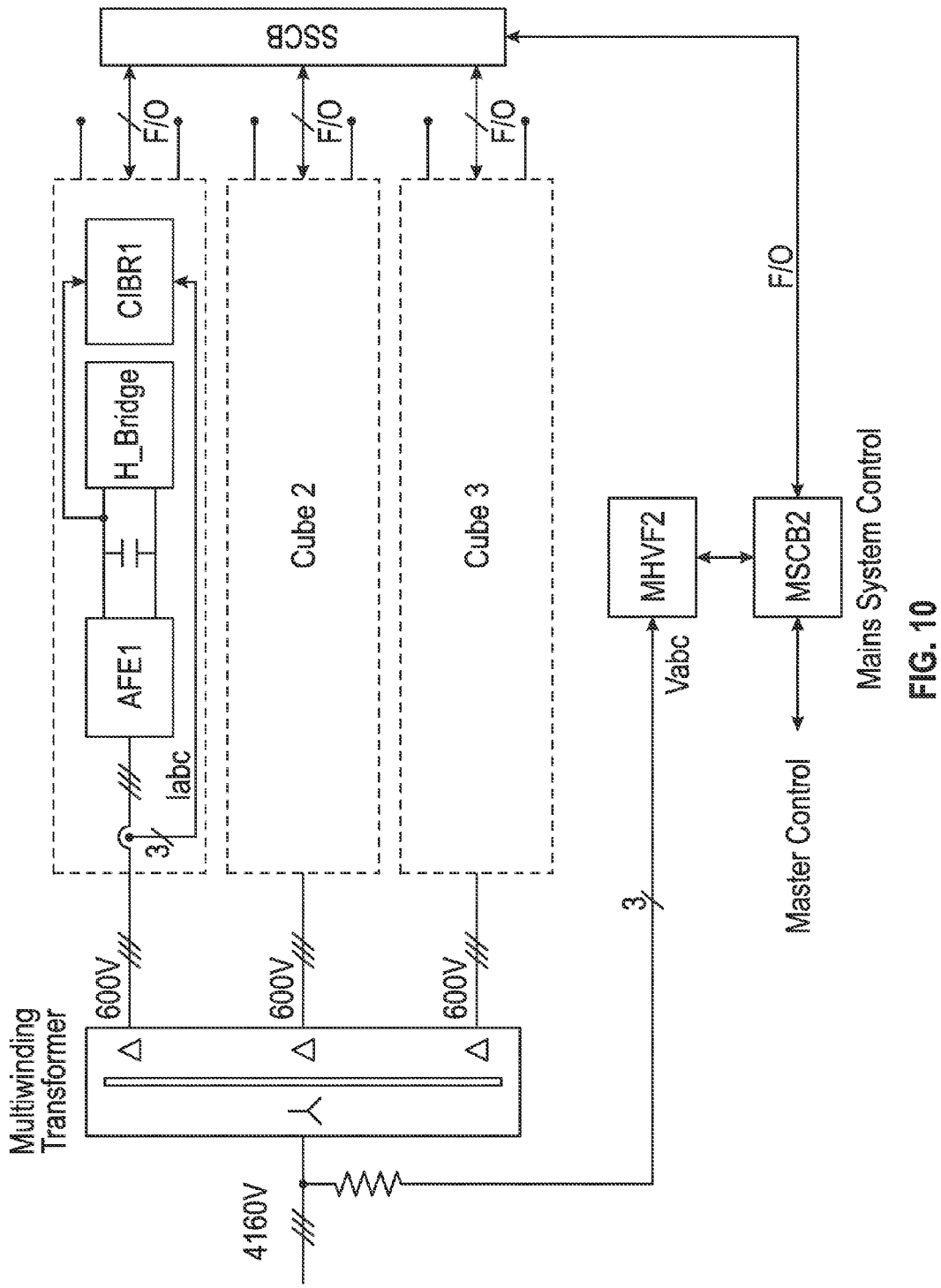
FIG. 10 is a block diagram of a slice of a power amplifier system that provides for multi-converter vector regenerative control in accordance with an embodiment of the present invention.

Referring now to FIG. 10, shown is a block diagram of a slice of a power amplifier system that provides for multi-converter vector regenerative control. As seen, incoming utility power (e.g., at 4160 v) is provided to a multiwinding power transformer. Note that in an implementation, this multiwinding transformer is not phase-shifted and is provided with a primary winding of a wye configuration and secondary windings of a delta configuration. The delta connection may trap any zero sequence components coming from or into the system. Of course alternatives are possible. Each of the secondary windings provides three phase power to a corresponding power cube.

In the illustration shown, each power cube is capable of regeneration, as the cubes include an active front and to receive the three phase power. The output of the active front end, which may be formed of IGBTs, is coupled to a DC bus that in turn couples to an H-bridge, itself formed of IGBTs to thus generate power outputs. As seen to provide feedback information for control internally to the cube via a cube controller (CIBRI), current information ($I_{abc}$) is obtained from the output of the multiwinding transformer. In addition, voltage information is obtained from the DC bus. In addition to providing internal control, the cube controller is further coupled, e.g., via a fiber optic connection, to a slice system control board which handles slice-level control. In turn, this slice system control board is coupled to a main system control board that in turn couples to a main master controller.

To provide incoming voltage information regarding the input connection, voltage information is obtained from the input to the multiwinding transformer via a high voltage feedback circuit that couples to the main high voltage feedback board (MHVF2) and to the system control board (MSCB2) via fiber optic link and located in the mains cabinet. Note that in the implementation of FIG. 10, the need for extra inductances to provide regenerative operation is avoided. That is, there is no need for inductors coupled either on the input to the transformer or the output from the transformer to provide this feedback information used in performing regenerative control. As such, the multiwinding transformer acts as a sensor for multilevel AFE converter control. An equivalent constant value of the secondary leakage (per phase) is utilized to tune current control loops of each AFE module. From this point of view, each regenerative cube control perceives the effect of a simple virtual inductor in series between cube and the 4160V side. This innovative AFE control implementation reduces the number of voltage sensors, associated circuitry, and increases PAU power density by eliminating the need of installation of physical bulky inductance elements.

Using a modular configurable multi-megawatt power amplifier as described herein, a topology can scale power and voltage using independent modular building blocks. In this way, a system can be reconfigured for series or parallel schemes with a field configurable topology. Also, a system can provide for built-in redundancy, enabling operation even when one or more slices have a failure. Furthermore, the system can be controlled to enable variable output frequency operation. In an embodiment, the PAU system may be operated up to 850 Hz supporting 25% of the nominal load. Extra slice cooling capability may be added per load requirements.

By combining PAUs in series/parallel and applying classical vector control schemes, sophisticated power configuration topologies can be easily created in the field. Power quality of input/output waveforms and redundancy can be manipulated by adding or subtracting slices into the system and making proper software changes. Component galvanic isolation properties and distributed fiber optic interface hierarchy are key factors for product implementation.

What is claimed is:
1. A power converter comprising:
a first transformer;
a plurality of power amplifier units coupled to the first transformer, each of the power amplifier units including:
a plurality of slices, wherein each of the plurality of slices comprises a transformer and a plurality of power cubes each including a power conversion module including an AC/DC/AC converter;
a mains controller to control the plurality of slices; and
a feedback conditioning system coupled to the mains controller;
a plurality of input contactors each coupled to an input of one of the plurality of power amplifiers and a plurality of output contactors coupled to an output of one of the plurality of power amplifiers via which each of the plurality of power amplifier units is to couple between the first transformer and a load; and
a master controller coupled to the plurality of power amplifier units, wherein the master controller is to enable redundancy in the power converter such that the power converter is to operate with at least one of the plurality of power amplifier units being disabled via at least one of the corresponding input contactor and output contactor, each of the plurality of power amplifier units being a modular configurable unit configured to operate in a selected one or more of a regenerative mode, a partial regenerative mode, and a non-regenerative mode.

2. The power converter of claim 1, wherein each of the plurality of slices is configured within an insulative housing.

3. The power converter of claim 2, wherein the plurality of power cubes of at least some of the plurality of slices comprises an active front end.

4. The power converter of claim 2, wherein the mains controller is to cause the plurality of power amplifier units to electronically phase shift carrier signals of the plurality of power cubes per phase.

5. The power converter of claim 2, wherein the mains controller of a first power amplifier unit produces control reference commands to enable the regenerative mode based on a plurality of control signals generated using a leakage inductance model.

6. The power converter of claim 5, wherein the leakage inductance model is based on one or more parameters extracted from the transformer of the slice.

7. The power converter of claim 1, further comprising a bus assembly configured to flexibly couple together the plurality of slices of at least one of the plurality of power amplifier units.

8. The power converter of claim 7, wherein the bus assembly is adapted to a top portion of a plurality of cabinets each including at least one of the plurality of slices of one of the power amplifier units.

9. The power converter of claim 1, wherein the feedback conditioning system is further coupled to an input of the plurality of slices and an output of the plurality of slices.

10. The power converter of claim 1, wherein the mains controller is to cause the corresponding power amplifier units to inject power into the load or to extract power from the load, in an open loop mode.

11. The power converter of claim 1, further comprising a second controller to cause the corresponding power amplifier units to inject power into the load or to extract power from the load, in a closed loop mode.

12. The power converter of claim 1, wherein in a first one of the power amplifier units, a first portion of the plurality of slices are coupled in series and a second portion of the plurality of slices are coupled in series, wherein the first and second portions are coupled in parallel and the number of the plurality of slices is field configurable.

13. The power converter of claim 12, wherein each of the plurality of power amplifier units further comprises a plurality of slice controllers each associated with one of the plurality of slices, and the plurality of slice controllers to translate reference commands from the mains controller to create regenerative control signals for the corresponding slice.

14. The power converter of claim 1, wherein each of the plurality of power amplifier units further comprises at least one cooling system to provide cooling to the plurality of slices, wherein the at least one cooling system uses a liquid coolant.

15. The power converter of claim 1, wherein the plurality of power amplifier units are configured to operate as redundant bi-directional power converters.

16. A power converter comprising:
a first transformer;
a plurality of bi-directional redundant power amplifier units to couple between a utility grid via the first transformer and a load grid to process power bi-directionally between the utility grid and the load grid, wherein at least one of the plurality of bi-directional redundant power amplifier units includes:
a first plurality of slices coupled in series, each of the first plurality of slices comprising a transformer and a plurality of power cubes each comprising a power conversion module including an AC/DC/AC converter, wherein at least one of the first plurality of slices comprises a redundant slice to provide power when another slice of the first plurality of slices is disabled;
a second plurality of slices coupled in series, each of the second plurality of slices comprising a transformer and a plurality of power cubes each comprising a power conversion module including an AC/DC/AC converter, wherein at least one of the second plurality of slices comprises a redundant slice to provide power when another slice of the second plurality of slices is disabled, the first plurality of slices and the second plurality of slices coupled in parallel;
an output inductor coupled to an output of the first plurality of slices and to an output of the second plurality of slices; and
a mains controller to control the first plurality of slices and the second plurality of slices;
a plurality of input contactors each coupled to an input of one of the plurality of bi-directional redundant power amplifier units and a plurality of output contactors each coupled to an output of one of the plurality of bi-directional redundant power amplifier units via which each of the plurality of bi-directional redundant power amplifier units is to couple between the utility grid and the load grid, the plurality of input contactors and the plurality of output contactors to flexibly to enable addition of power to the load grid and subtraction of power from the load grid; and
a master controller coupled to the plurality of bi-directional redundant power amplifier units, wherein the master controller is to enable operation of the power converter with one or more of the plurality of bi-directional redundant power amplifier units being disabled via at least one of the corresponding input contactors and output contactors and at least one of the plurality of bi-directional redundant power amplifier units being enabled.

17. The power converter of claim 16, wherein each of the plurality of power amplifier units comprises a modular configurable unit to operate in a selected one or more of a regenerative mode, a partial regenerative mode, and a non-regenerative mode.

* * * * *